United States Patent [19]

Mizuno et al.

[11] Patent Number: 5,886,421
[45] Date of Patent: Mar. 23, 1999

[54] VEHICLE START-UP PERMISSION DEVICE AND IDENTIFICATION CODE REGISTERING METHOD

[75] Inventors: Yoshiyuki Mizuno; Sadao Kokubu; Hisashi Aoki; Takashi Mizuno; Shinichi Koga, all of Aichi-ken, Japan

[73] Assignee: Kabushiki Kaisha Tokai-Rika-Denki Seisakusho, Ohguchi, Japan

[21] Appl. No.: 836,403

[22] PCT Filed: Nov. 10, 1995

[86] PCT No.: PCT/JP95/02301

§ 371 Date: Jun. 4, 1997

§ 102(e) Date: Jun. 4, 1997

[87] PCT Pub. No.: WO96/15346

PCT Pub. Date: May 23, 1996

[30] Foreign Application Priority Data

Nov. 11, 1994 [JP] Japan ................................. 6-277409

[51] Int. Cl.⁶ ............................................... B60R 25/04
[52] U.S. Cl. ................................... 307/10.5; 180/287
[58] Field of Search ................... 307/10.1–10.6; 180/287; 340/425.5, 426, 825.3, 825.32, 825.34, 825.54, 825.44, 825.69, 825.72; 361/171, 172

[56] References Cited

U.S. PATENT DOCUMENTS 5,055,701  10/1991  Takeuchi ............................... 307/10.2
5,600,723   2/1997  Woodall et al. .................... 340/825.34
5,670,933   9/1997  Hayashi et al. ......................... 340/426

FOREIGN PATENT DOCUMENTS

A-1-250572  10/1989  Japan.
A-2-51998    2/1990  Japan.

*Primary Examiner*—Richard T. Elms
*Attorney, Agent, or Firm*—Oliff & Berridge, PLC

[57] ABSTRACT

A vehicle start-up permission device in which an identification code stored in an electronic key can be kept secret. A start-up permission ECU (1) is magnetically coupled with a transmit-receive controlling circuit (6) of an electronic key (3) via an antenna (2) and an antenna (5) of the electronic key (3) with the electronic key (3) being inserted in an ignition key (4) so as to supply electric power for the circuit. When the ignition switch (4) is operated to an ACC position, the start-up permission ECU (1) transmits a random number code. When the transmit-receive controlling circuit (6) of the electronic key (3) receives the random number code, it converts by predetermined encryption processing a previously registered key code to a return code on the basis of the random number code and returns the return code. When the start-up permission ECU (1) receives the return code, it decodes a key code on the basis of the random number code, and when the key code coincides with the previously registered key code, the start-up permission ECU (1) outputs a start-up permission signal to an engine-controlling ECU (7).

18 Claims, 8 Drawing Sheets

VEHICLE START-UP PERMISSION DEVICE AND IDENTIFICATION CODE REGISTERING METHOD

TECHNICAL FIELD

The present invention relates to a vehicle start-up permission device which permits the start-up of an engine when an identification code read from a transmitter-receiver coincides with a previously set identification code and to an identification code registering method in which a transmitter-receiver code for specifying the transmitter-receiver and a vehicle code for specifying a vehicle are registered, as identification codes, in the transmitter-receiver and the vehicle start-up permission device, respectively.

BACKGROUND OF THE INVENTION

In order to improve security, it has been recently suggested that, in a vehicle, an electronic key be used in which, for example, a transmitting circuit is integrated with a mechanical key. In this structure, an identification code is transmitted from an electronic key in a state of being inserted in an ignition switch, and when the identification code transmitted from the electronic key coincides with a previously set identification code, the electronic key is judged to be true and, based on this, an engine is caused to start up in accordance with a turning operation of the electronic key.

However, in the above-described conventional structure, the identification code itself is transmitted from the electronic key, and therefore, it is possible to read the identification code stored in the electronic key.

SUMMARY OF THE INVENTION

The present invention has been achieved in view of the above-described circumstances and an object thereof is to provide a vehicle start-up permission device in which an identification code stored in a transmitter-receiver can be also kept secret, and to provide an identification code registering method in which respective identification codes stored in the transmitter-receiver and in the vehicle start-up permission device are kept secret and are registered both in the transmitter-receiver and in the vehicle start-up permission device.

The present invention is an identification code registering method in which a vehicle code for specifying a vehicle and a transmitter-receiver code for specifying a transmitter-receiver are respectively registered in the transmitter-receiver and in a vehicle start-up permission device which permits start-up of an engine when an identification code read from the transmitter-receiver coincides with a previously registered identification code, the method comprising the steps of: (A) registering the transmitter-receiver code and the vehicle code in the transmitter-receiver and the vehicle start-up permission device, respectively; (B) transmitting a random number code prepared on the basis of a predetermined procedure in the vehicle start-up permission device, converting by predetermined encryption processing the transmitter-receiver code to a return code on the basis of the random number code received by the transmitter-receiver to transmit the return code, restoring the return code received by the vehicle start-up permission device to the transmitter-receiver code on the basis of the transmitted random number code, and registering the transmitter-receiver code in the vehicle start-up permission device; and (C) in the vehicle start-up permission device, converting by predetermined encryption processing the vehicle code to a random number vehicle code on the basis of the random number code and transmitting the random number vehicle code, restoring the random number vehicle code received by the transmitter-receiver to the vehicle code on the basis of the random number code, and registering the vehicle code in the transmitter-receiver.

In accordance with the present invention, the identification codes are respectively registered in the transmitter-receiver and the vehicle start-up permission device, which codes being provided to specify the transmitter-receiver and the vehicle start-up permission device, and thereafter, the vehicle code and the transmitter-receiver code can be registered in the transmitter and the vehicle start-up permission device, respectively. For this reason, it becomes unnecessary to manage the vehicle start-up permission device and the transmitter-receiver in an integrated manner until these codes are registered. Further, since the random number code, the return code, and the random number vehicle code are transmitted to be registered and the identification code itself is not transmitted, the identification code can be kept secret. Meanwhile, in this case, step (C) may be executed prior to step (B).

DETAILED DESCRIPTION OF THE PREFERRED EMBODIMENTS

Referring now to the attached drawings, the present invention will be hereinafter described in detail.

Figure 1:
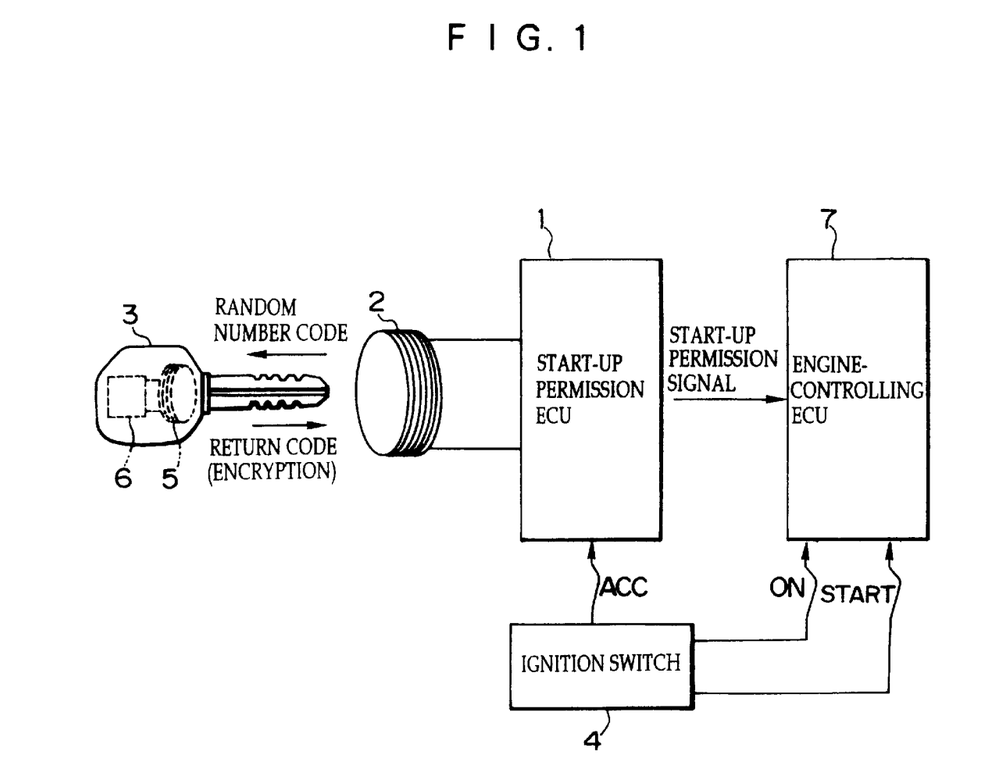
FIG. 1 is a schematic diagram which shows an overall structure in a first embodiment of the present invention.

FIG. 1 schematically shows an overall structure. In this figure, a start-up permission ECU (Electronic Control Unit) 1, which serves as start-up permission means, random number code transmitting means, and identification code transmitting means, includes a coil 2 and is electromagnetically coupled via the coil 2 with an electronic key 3 serving as a transmitter-receiver.

In other words, the coil 2 is disposed in such a manner as to correspond to an ignition switch 4, and with the electronic key 3 inserted in the ignition switch 4, the coil 2 is electromagnetically coupled with a coil 5 of the electronic key 3 so as to supply electric power for a transmit-receive controlling circuit 6 and an identification code is read from the transmit-receive controlling circuit 6.

Here, when the start-up permission ECU 1 receives an ACC signal (i.e., a signal which indicates that the switch is operated at an ACC position), the start-up permission ECU 1 communicates with the transmit-receive controlling circuit 6 of the electronic key 3. When the electronic key 3 is judged to be true, the start-up permission ECU 1 outputs a start-up permission signal to an engine-controlling ECU 7.

The engine-controlling ECU 7 receives an ON signal from the ignition switch 4 (i.e., a signal which indicates that the switch is operated at an ON position) and a START signal from the ignition switch 4 (i.e., a signal which indicates that the switch is operated at a START position) in a state in which the start-up permission signal is input to the engine-controlling ECU 7, and when the engine-controlling ECU 7 accepts the START signal, it is provided to start up an engine by driving a starter of the engine.

Figure 2:
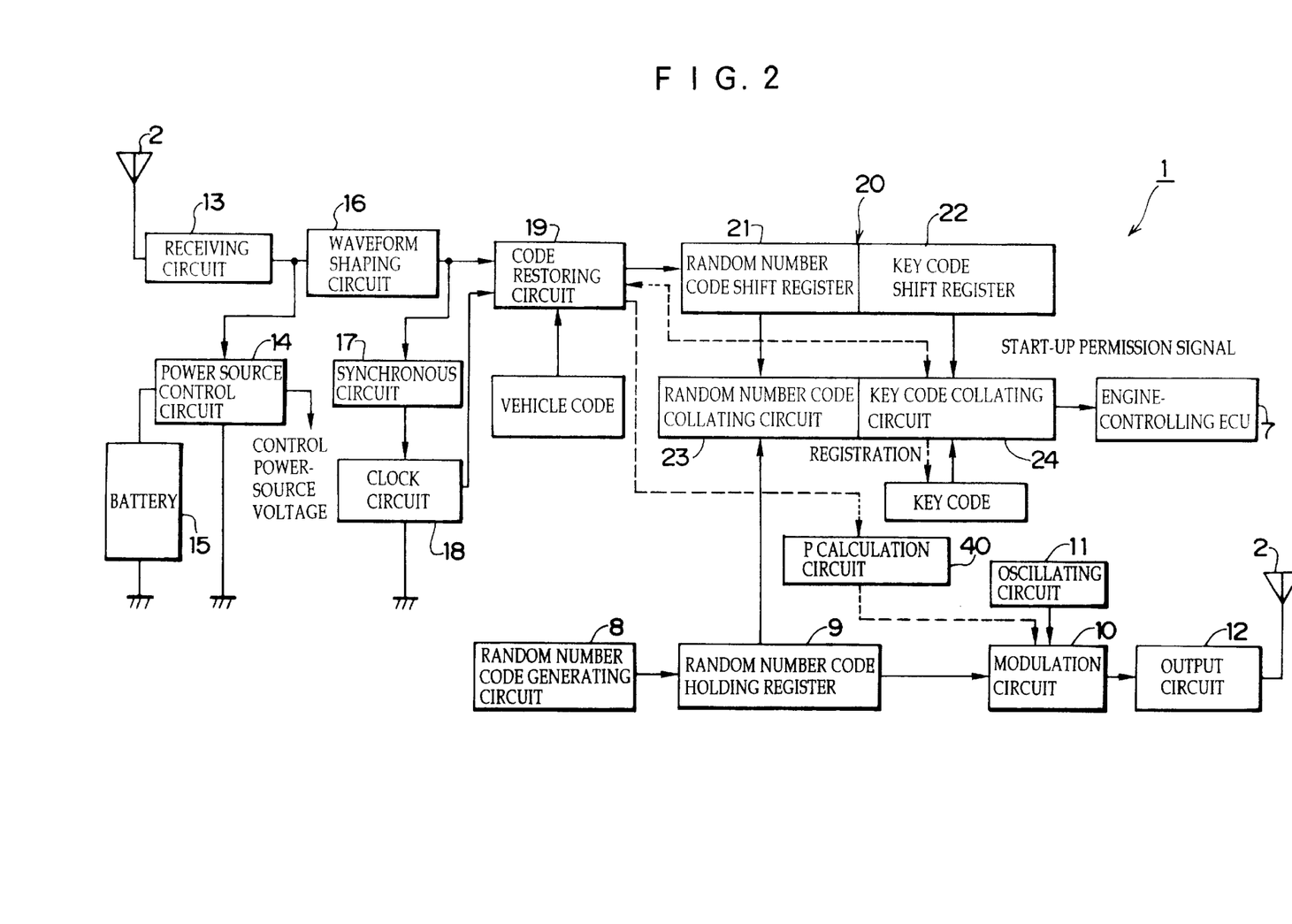
FIG. 2 is a functional block diagram which shows a start-up permission ECU.

FIG. 2 is a functional block diagram of the start-up permission ECU 1. In this figure, when the electronic key 3 inserted in the ignition switch 4 is operated at the ACC position, a random number code generating circuit 8 generates random numbers and the random numbers are stored in a random number code holding register 9. A modulation circuit 10 modulates the random number code stored in the random number code holding register 9 by an oscillating frequency of an oscillating circuit 11 to a transmission signal and outputs the modulated signal to an output circuit 12. The output circuit 12 transmits the transmission signal from the modulation circuit 10 via the coil 2.

When it is determined by a receiving circuit 13 that the electronic key 3 is inserted in the ignition switch 4, on the basis of a signal received via the antenna 2, the receiving circuit 13 sends an instruction to a power source control circuit 14. When the power source control circuit 14 receives the instruction from the receiving circuit 13, it outputs power source voltage from a battery 15 to each of the circuits which form the start-up permission ECU 1 with the power source voltage being stabilized at a control power source voltage.

Further, the receiving circuit 13 outputs the signal received from the coil 2 in such a manner that the signal is subjected to waveform shaping processing through a waveform shaping circuit 16. A synchronous circuit 17 separates a synchronous signal included in the received signal from the waveform shaping circuit 16. A clock circuit 18 outputs a clock signal in accordance with the synchronous signal of the synchronous circuit 17. A code restoring circuit 19 restores (decodes) a random number code and a key code by inputting the received signal from the waveform shaping circuit 16 synchronously with the clock signal from the clock circuit 18. In this case, the random number code and the key code can be restored in such a manner that a predetermined calculation is effected for the received signal on the basis of a vehicle code. Meanwhile, the code restoring circuit 19 includes a $\phi_S$ determination circuit, not shown, for making a determination for $\phi_S$, which indicates that a vehicle code, S, (which will be described later) is blank (i.e., vehicle code S is not registered in a nonvolatile memory of the electronic key 3).

A code determination circuit 20 is formed from a random number code shift register 21 and a key code shift register 22 and determines whether the random number code and key code received from the code restoring circuit 19 is true or not.

Namely, the random number code shift register 21 stores the random number code transmitted from the code restoring circuit 19 by a shift operation. Further, the key code shift register 22 stores the key code transmitted from the code restoring circuit 19 by shift operation. A random number code collating circuit 23 compares the random number code stored in the random number code shift register 21 and the random number code stored in the random number code holding register 9. Further, a key code collating circuit 24 compares a key code stored in a key code shift register 22 and a key code previously registered in a nonvolatile memory. In this case, when it is determined by the random number code collating circuit 23 that both random number codes coincide with each other, it is possible to determine that communication between the electronic key 3 and the start-up permission ECU 1 was made normally. Accordingly, when the communication between the electronic key 3 and the start-up permission ECU 1 is made normally and it is determined by the key code collating circuit 24 that both key codes coincide with each other, it is possible to determine that the proper electronic key 3 is used. When the random number code and the key code coincide with each other as described above, the code determination circuit 20 outputs a start-up permission signal to the engine-controlling ECU 7.

Further, the key code collating circuit 24 includes a flag determination circuit, not shown, for determining whether a flag of key code K, described later, is set up and a write circuit, not shown, for writing the key code K into a nonvolatile memory of the start-up permission ECU 1. The key code collating circuit 24 is connected to the code restoring circuit 19. In addition, a P calculation circuit 40, described later, is provided in the start-up permission ECU 1 and the P calculation circuit 40 is connected to the above-described code restoring circuit 19 and also to the modulation circuit 10.

Meanwhile, although in FIG. 2 the start-up permission ECU 1 is shown in a functional block diagram, the start-up permission ECU 1 is mainly formed of a microcomputer.

Figure 3:
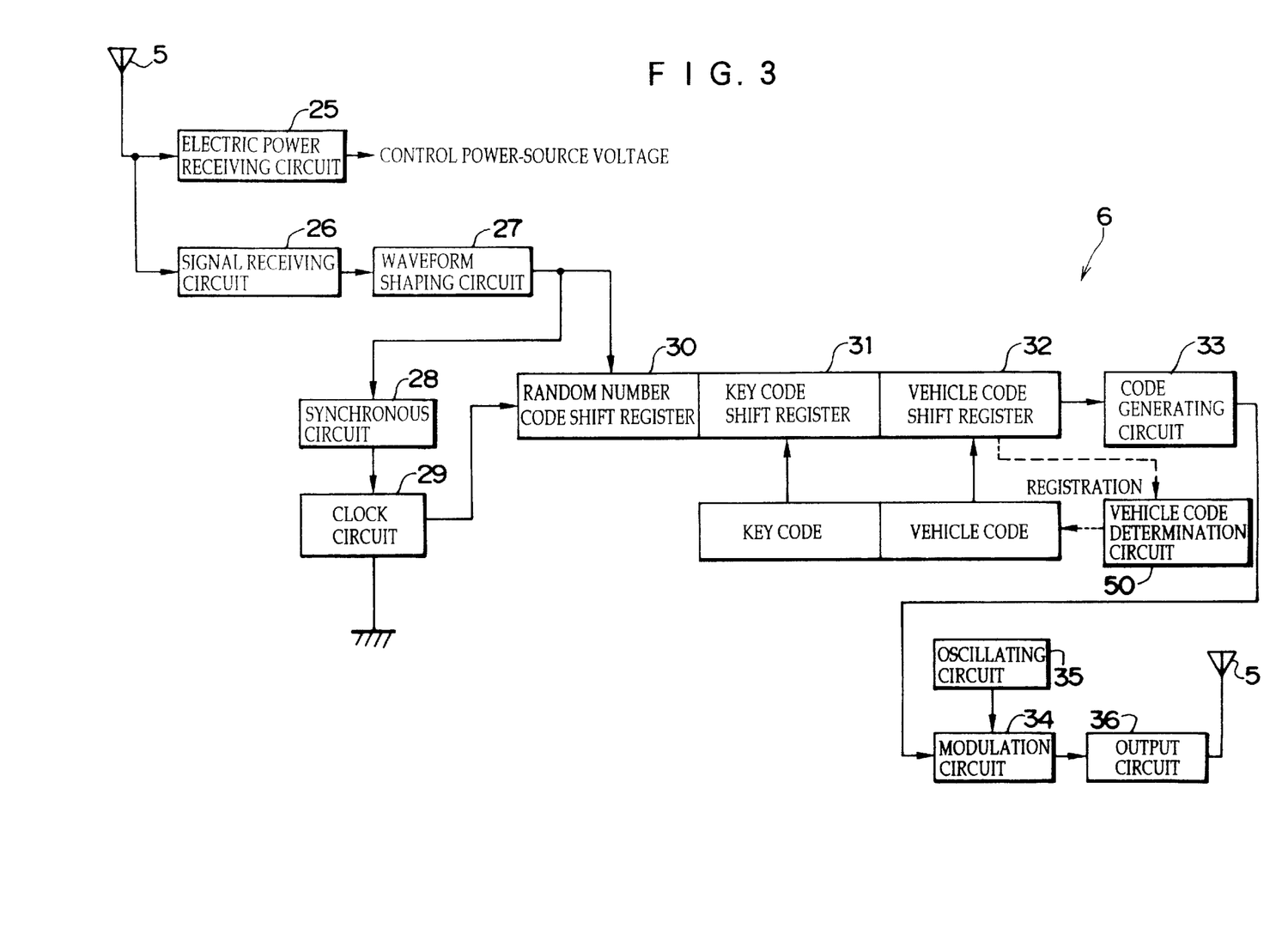
FIG. 3 is a functional block diagram which shows a transmit-receive controlling circuit of an electronic key.

FIG. 3 shows the transmit-receive controlling circuit 6 of the electronic key 3 in a functional block diagram. In this figure, an electric power receiving circuit 25 stabilizes electric power received by a receiving antenna 5 at a predetermined control power source voltage and outputs the same. A signal receiving circuit 26 outputs the signal received by the receiving antenna 5 in such a manner that the received signal is set in a state of being shaped by the waveform shaping circuit 27. A synchronous circuit 28 separates a synchronous signal included in the received signal from the waveform shaping circuit 27. A clock circuit 29 outputs a clock signal in accordance with the synchronous signal of the synchronous circuit 28.

A random number code shift register 30 stores, by a shift operation, a random number code included in the received signal from the waveform shaping circuit 27 in accordance with the clock signal from the clock circuit 29. A key code shift register 30 stores a key code stored in a nonvolatile memory by a shift operation. A vehicle code shift register 32 stores a vehicle code stored in a nonvolatile memory by a shift operation.

A code generating circuit 33 generates a return code by predetermined encryption processing on the basis of the respective codes stored in the random number code shift register 30, the key code shift register 31, and the vehicle code shift register 32.

A modulating circuit 34 modulates a modulation code from the code generating circuit 33 by an oscillating frequency from an oscillating circuit 35 to generate a return code. An output circuit 36 transmits the return code from the modulation circuit 34 through the antenna 5.

Further, the electronic key 3 is provided with a vehicle code determination circuit 50 for determining whether or not vehicle code S (vehicle code S=$\phi_S$) has been registered in a nonvolatile memory of the electronic key 3. The vehicle code determination circuit 50 includes a flag determination circuit, not shown, for determining whether a flag of vehicle code S is set (i.e., whether vehicle code S has been already registered without $\phi_S$ being indicated) and a write circuit, not shown, for writing vehicle code S in the nonvolatile memory. The vehicle code determination circuit 50 is connected to the above-described vehicle code shift register 32 and also to the nonvolatile memory.

Meanwhile, although in FIG. 3 the transmit-receive controlling circuit 6 of the electronic key 3 is shown in a functional block diagram, the transmit-receive controlling circuit 6 is mainly formed of a microcomputer.

Figure 4:
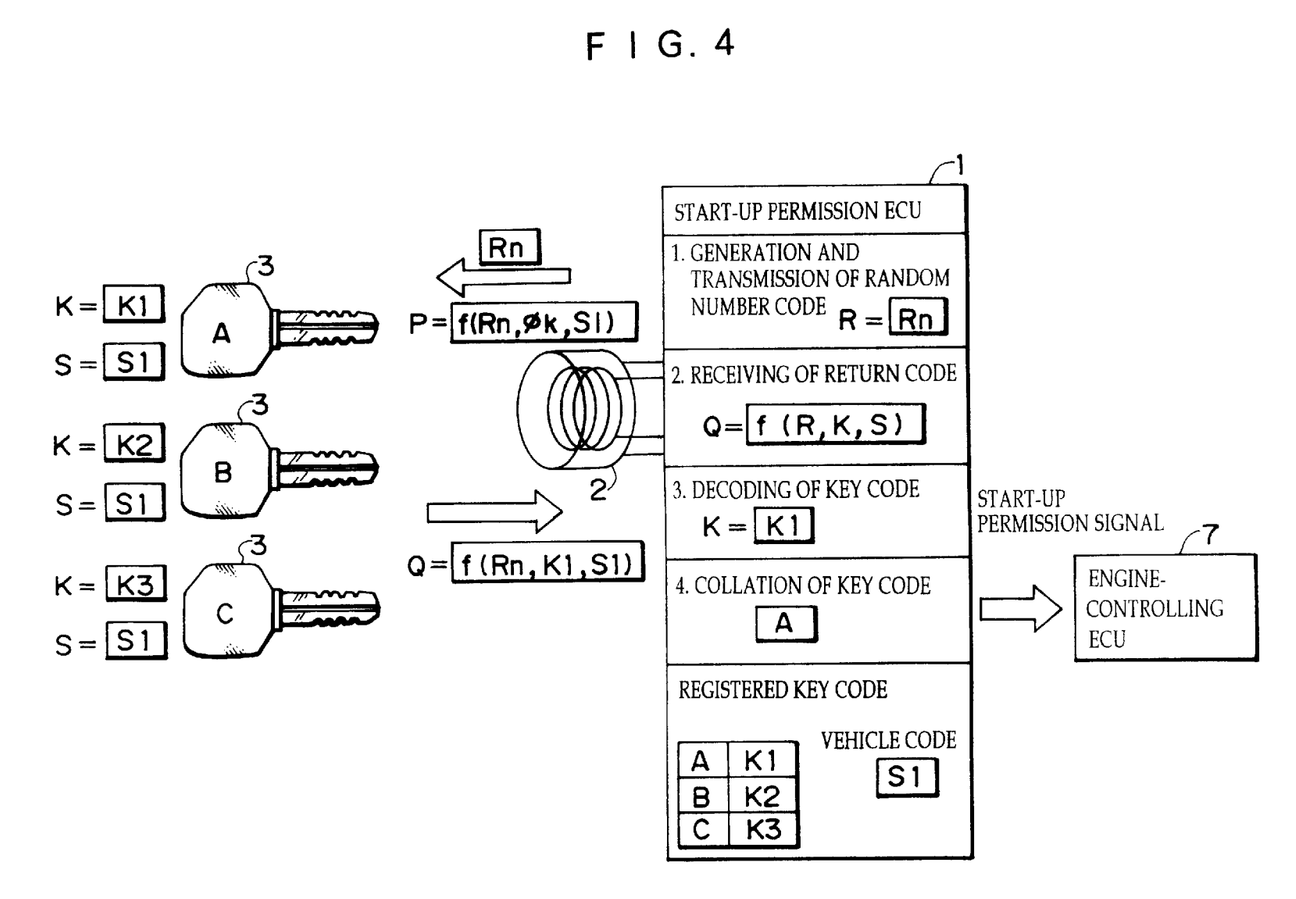
FIG. 4 is a diagrammatic view which shows overall structure and operation.

FIG. 4 is a diagrammatic view showing the overall structure and operation. In this figure, a vehicle can be provided with at most three electronic keys, A, B, and C, including a preliminary key. Separate key codes each serving as an identification code for specifying a proper electronic key are set for these electronic keys A, B, and C and an identical vehicle code can be registered in each of these electronic keys.

Namely, key codes K1, K2, and K3 are set for electronic keys A, B, and C, respectively. Further, identical vehicle code S1 can be registered in each of electronic keys A, B, and C.

On the other hand, three key codes at most can be registered in the vehicle. Namely, key codes K1, K2, and K3 can be registered so as to correspond to the three electronic keys A, B, and C, respectively. Meanwhile, key-code setting for the electronic key 3 and vehicle-code setting for the start-up permission ECU 1 can be effected in such a manner that, for example, these codes are electronically written in by a predetermined write device. Further, registration of the vehicle code in the electronic key 3 and registration of the key code in the start-up permission ECU 1 can be effected in accordance with a predetermined procedure, which will be described later.

Next, an operation of the above-described structure will be described.

When the electronic key 3 is inserted in the ignition switch 4, the start-up permission ECU 1 applies a high-frequency electric power to the coil 2. As a result, induced electromotive force is generated in the coil 5 of the electronic key 3, and therefore, electric power is supplied for the transmit-receive controlling circuit 6, and in accordance with the supply of electric power, the transmit-receive controlling circuit 6 starts operating.

Figure 5:
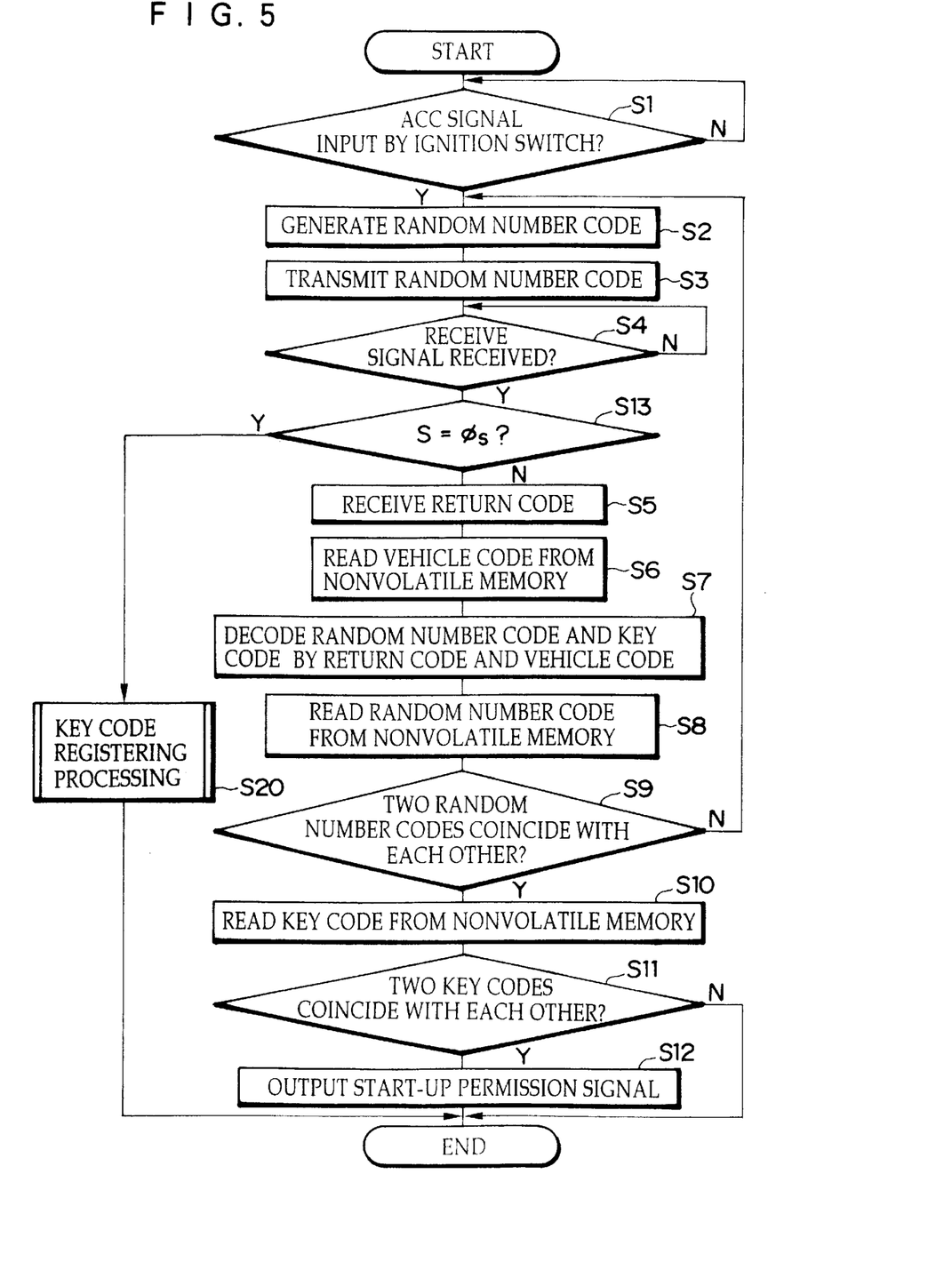
FIG. 5 is a flowchart which shows the operation of a start-up permission ECU.
Figure 6:
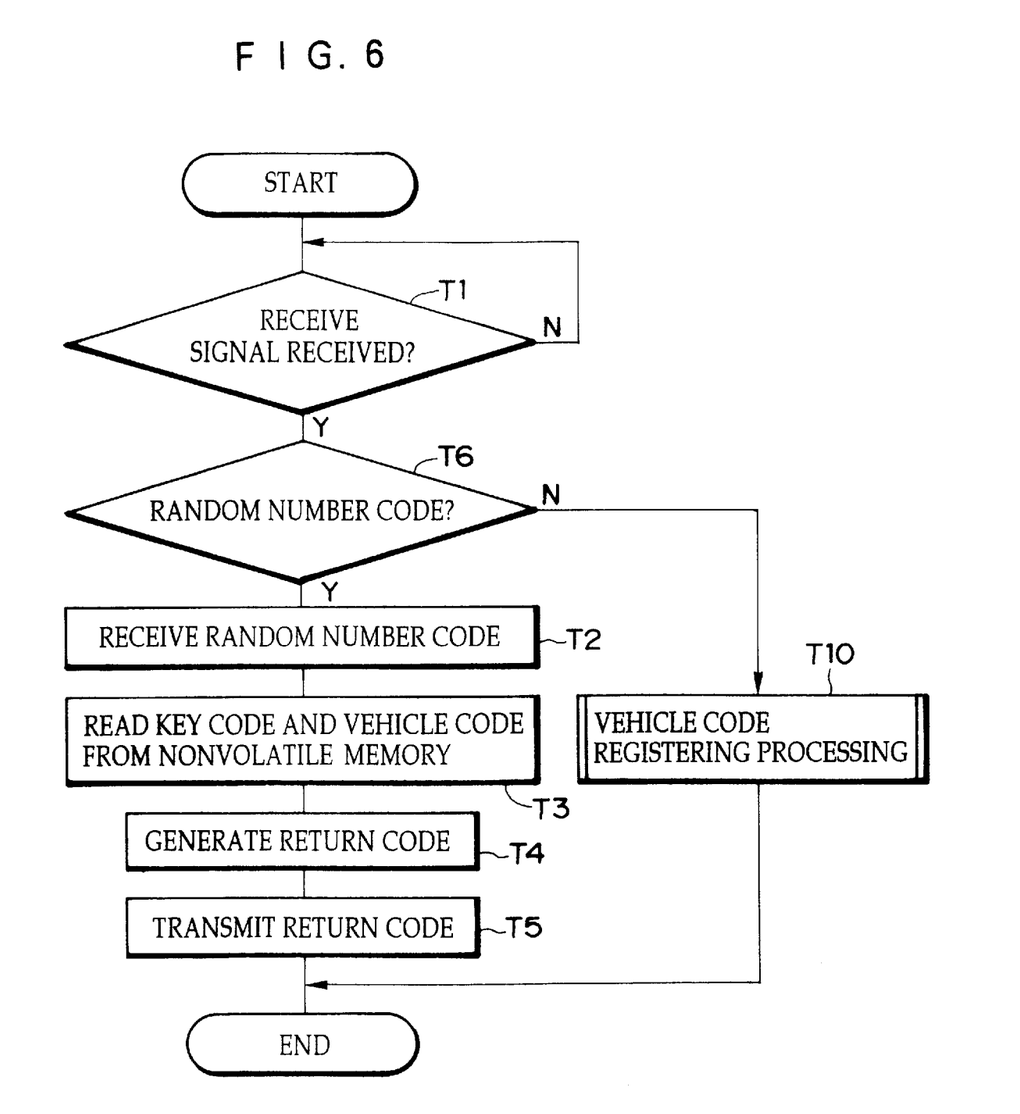
FIG. 6 is a flowchart which shows the operation of a transmit-receive controlling circuit of the electronic key.

FIG. 5 shows operation of the start-up permission ECU 1 and FIG. 6 shows the operation of the transmit-receive controlling circuit 6 of the electronic key 3. The start-up permission ECU 1 is first set in a waiting state until the ACC signal is input from the ignition switch 4 (step S1 of FIG. 5).

When a driver effects a turning operation of the electronic key 3 to the ACC position so as to start up the engine, the start-up permission ECU 1 generates a random number code (step S2). In this case, the start-up permission ECU 1 is provided to generate random number code Rn in an updated state each time the ACC signal is input (operation 1 shown in FIG. 4). At this time, an calculation expression for preparing random number code Rn is set to be different for each type of vehicle or for each of vehicles for the reason that the random number prepared by a predetermined calculation expression has period characteristics and by understanding the period characteristics, decoding of the random number code becomes relatively facilitated.

Subsequently, the start-up permission ECU 1 transmits the generated random number code (step S3). As a result, the random number Rn is transmitted from the coil 2 of the start-up permission ECU 1 (see FIG. 4).

In this state, the start-up permission ECU 1 is set in a waiting state until it receives the received signal from the electronic key 3 (step S4).

On the other hand, the transmit-receive controlling circuit 6 of the electronic key 3 is set in a waiting state until it receives the received signal from the start-up permission ECU 1 (step T1 in FIG. 6), and determines whether random number code Rn has been received or not at the point in time when the received signal was received (step T6). When it is determined that random number code Rn has been received, the transmit-receive controlling circuit 6 receives random number code Rn indicated by the received signal (step T2).

Subsequently, the transmit-receive controlling circuit 5 reads the key code and the vehicle code from the nonvolatile memory (step T3), generates the return code on the basis of the key code and the vehicle code (step T4), and transmits the return code (step T5).

In other words, the transmit-receive controlling circuit 6 prepares the return code, Q, by effecting predetermined encryption processing for a key code, K1, which is previously stored on the basis of received random number code Rn and a previously stored vehicle code, S1. Concretely, the transmit-receive controlling circuit 6 prepares return code Q by using key code K1 and vehicle code S1 on the basis of random number code Rn received with electric power being supplied by the coil 4 and in accordance with a predetermined encryption calculation expression, Q=f(R, K, S) (see FIG. 4), and transmits the same through the coil 5. Meanwhile, when the key code of the electronic key 3 has not been registered, encryption calculation expression Q is set to be equal to f(R, $\phi_K$, S) according to $\phi_K$ which indicates that key code K is blank, which will be described later.

After the start-up permission ECU 1 has received the random number code as described above, it is brought into a state of receiving the received signal (step S4 in FIG. 5), receives return code Q indicated by the received signal when the received signal is received (step S5 and operation 2 in FIG. 4), and determines whether or not vehicle code S is blank ($\phi_S$) (step S13 and the code restoring circuit 19 shown in FIG. 2). Since the vehicle code has already been registered unless it is blank ($\phi_S$), the start-up permission ECU 1 reads the vehicle code from the nonvolatile memory (step S6) and decodes a random number code and a key code from the nonvolatile memory on the basis of the vehicle code (step S7).

Subsequently, the start-up permission ECU 1 reads the random number code from the nonvolatile memory (step S8) and determines whether the two random number codes coincide with each other (step S9). At this time, when the two random number codes are different from each other, it is determined that communication between the electronic key 3 and the start-up permission ECU 1 is incorrect and the routine proceeds to step S2, in which communication therebetween is executed again.

Further, when the two random number codes coincide with each other, the start-up permission ECU 1 makes a determination that communication with the electronic key 3 is normal, reads a key code from the nonvolatile memory (step S10), and determines whether these two key codes coincide with each other (step S11). At this time, when the read key code coincides with any one of the three types of key codes, K1, K2, and K3, previously registered (operation 4 in FIG. 4), the start-up permission ECU 1 outputs the start-up permission signal to the engine-controlling ECU 7.

Accordingly, when the engine-controlling ECU 7 inputs the START signal from the ignition switch 4 with the start-up permission signal being input from the start-up permission ECU 1, the engine-controlling ECU 7 drives a starter to start up the engine.

Figure 7:
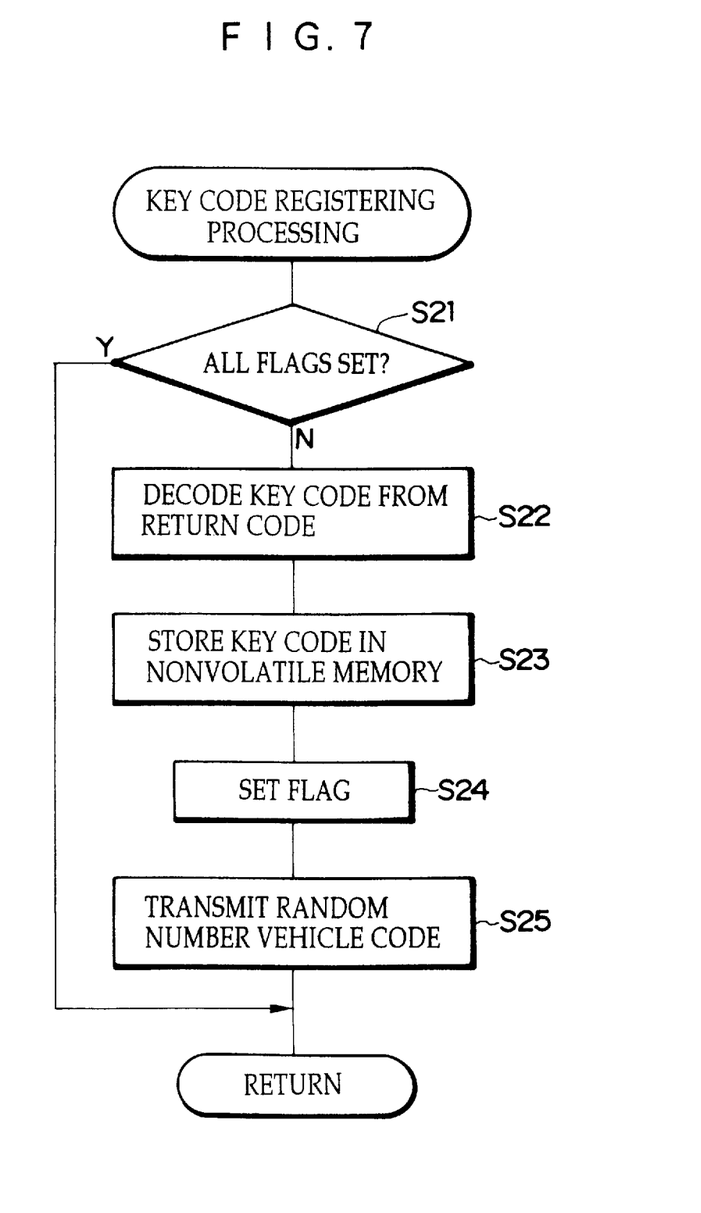
FIG. 7 is a flowchart which shows a subroutine of step S20 shown in FIG. 5.

On the other hand, when it is determined in step S13 that vehicle code S is blank ($\phi_S$), in step S20, the key code registering processing shown in FIG. 7 is executed. First, in step S21, on the basis of the determination made about whether all of the flags of storage areas A, B, and C (see FIG. 4) of the key codes of the nonvolatile memory of the start-up permission ECU 1 are set, it is determined whether key codes K1, K2, and K3 have already been registered in all of storage areas A, B, and C of the key codes of the nonvolatile memory of the start-up permission ECU 1 (a flag determination circuit, not shown, of the key code collating circuit 24 shown in FIG. 2).

When the decision of step S20 is yes, the three key codes have already been registered and further key codes cannot be stored, and therefore, the routine returns to step S20 and the routine of the start-up permission ECU 1 ends. Further, when the decision of step S20 is no, in the next step S22, key code K is decoded from return code Q (the key code shift register 22 and the key code collating circuit 24 shown in FIG. 2). In subsequent step S23, key code K is stored in the nonvolatile memory of ECU 1 (a write circuit, not shown, of the key code collating circuit 24 shown in FIG. 2), and in step S24, the flag is set. Meanwhile, the writing (registering) processing of key code K is effected in the order of A, B, and C and the flags are respectively set in this order. As a result, the registering processing of key code K of the electronic key 3 in the start-up permission ECU 1 is completed.

In subsequent step S25, random number vehicle code P is transmitted to the electronic key 3, a subroutine of the key code registering processing ends, and the routine returns to step S20, and as a result, the routine of the start-up permission ECU 1 ends. Note that random number vehicle code P is a code represented by the encryption calculation expression $P=f(R, \phi_K, S)$; specifically, R indicates a random number code represented by Rn as shown in FIG. 4, $\phi_K$ indicates that key code K of the electronic key 3 is not registered (i.e., blank) in the start-up permission ECU 1, and S indicates the vehicle code as described above, concretely, S1. This calculation processing is effected in the P calculation circuit 40 shown in FIG. 2. As a result, the modulation circuit 10 sends a modulated wave according to the above-described encryption calculation expression, $P=f(R, \phi_K, S)$, to the output circuit 12.

Figure 8:
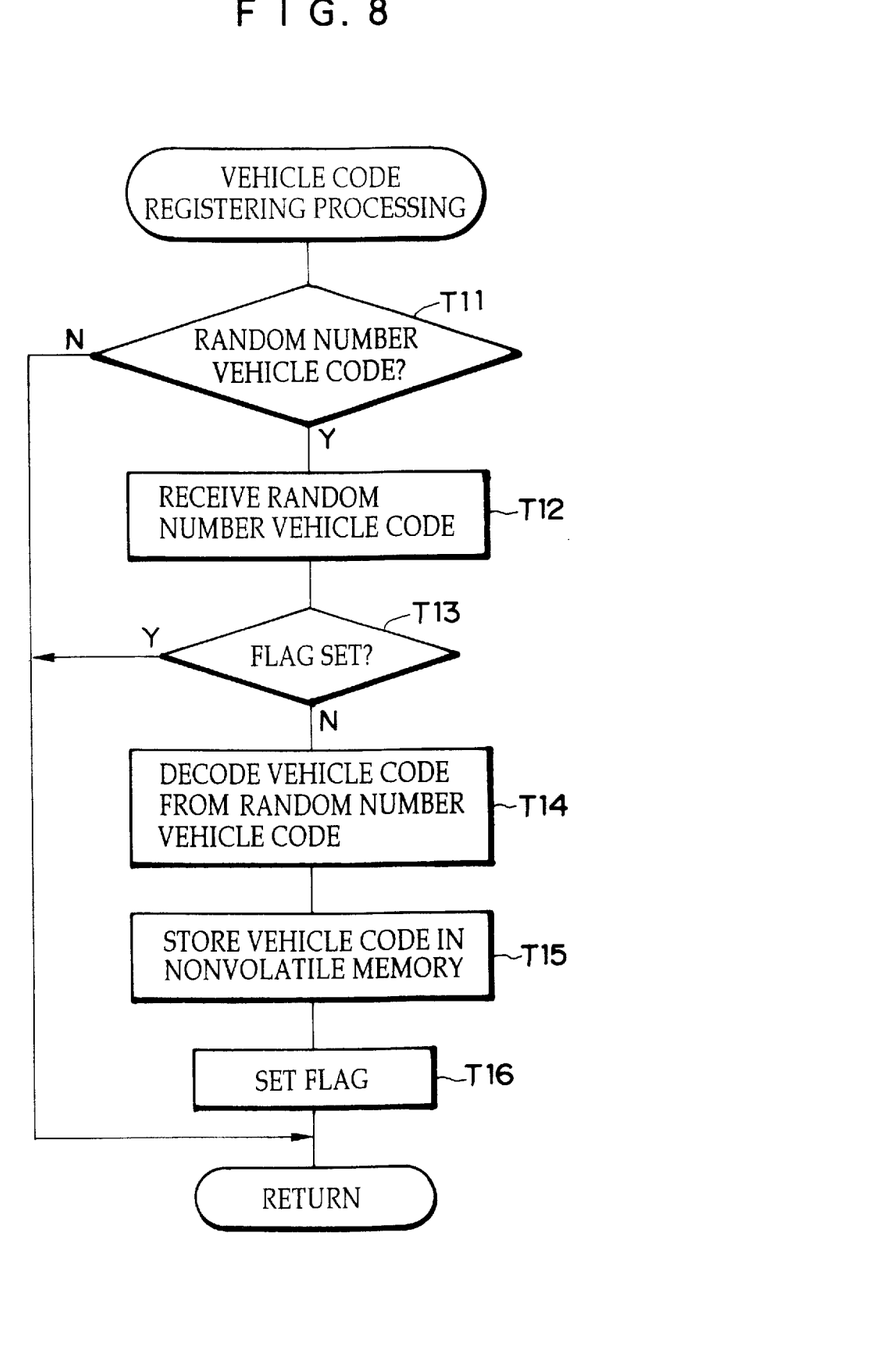
FIG. 8 is a flowchart which shows a subroutine of step T10 shown in FIG. 6.

When random number vehicle code P is transmitted to the electronic key 3, the electronic key 3 is different from random number code Rn in step T6 shown in FIG. 6, and therefore, the decision of step T6 is no. In step T10, the vehicle code registering processing shown in FIG. 8 is executed.

First, in step T11, it is determined whether random number vehicle code P (i.e., the code on the basis of the above-described encryption calculation expression $P=f(R, \phi_K, S)$) exists or not. When the decision of step T11 is no, it is determined that an incorrect signal such as a noise signal or the like has been received and the routine returns to step T10. When the decision of step T11 is yes, in subsequent step T12, random number vehicle code P is received. In the next step T13, on the basis of the determination made about whether the flag of the storage area S (see FIG. 4) of the vehicle code of the nonvolatile memory of the electronic key 3 is set, it is determined whether vehicle code S has already been registered in the nonvolatile memory of the electronic key 3 (a flag determination circuit, not shown, of the vehicle code determination circuit 50 shown in FIG. 3). When the decision of step T13 is yes, the routine returns to step T10. When the decision of step T13 is no, in the next step T14, the vehicle code S1 is decoded from random number vehicle code P (the avehicle code shift register 32 and the vehicle code determination circuit 50 shown in FIG. 3). In subsequent step T15, vehicle code S1 is stored in the nonvolatile memory of the electronic key 3 (a write circuit, not shown, of the vehicle code determination circuit 50 shown in FIG. 3). In the next step T16, the flag of vehicle code S is set up so as to avoid the overlapping of registration, and thereafter, the process returns to step T10 and the routine of the electronic key 3 ends.

In accordance with the above-described structure, the start-up permission ECU 1 transmits the random number code to the electronic key 3, the electronic key 3 generates and transmits the return code by the encryption processing of a key code on the basis of the random number code received from the start-up permission ECU 1 and the previously-stored vehicle code, the start-up permission ECU 1 decodes, on the basis of the vehicle code, the return code received from the electronic key 3 to the random number code and the key code, and only when the key code coincides with a previously-registered key code, it outputs the start-up permission signal to the engine-controlling ECU 7. Accordingly, unlike a conventional structure in which an identification code itself is returned from the electronic key, the key code serving as the identification code stored in the electronic key 3 can further be kept secret.

Further, when the return code is prepared in the electronic key 3, the return code is prepared on the basis of the previously registered vehicle code in addition to the random number code received from the start-up permission ECU 1. For this reason, the confidentiality of the key code stored in the electronic key 3 can be further improved.

Moreover, the start-up permission ECU 1 is provided to transmit the random number code in an updated state each time, and therefore, the random number code and the return code are each provided to be different each time. Accordingly, as compared to a structure in which the identical random number codes are continuously transmitted, the confidentiality of the key code can be further improved.

In addition, the calculation expression used to prepare the random number code for each type of vehicle or for each of vehicles is set differently, and therefore, the confidentiality of the key code can be further improved.

The present invention is not limited to the above-described embodiment, and various modifications or extension as described below may be made.

Only the key code or vehicle code may be stored in the transmit-receive controlling circuit 6 of the electronic key 3.

The electronic key 3 may also be constructed such that with no mechanical key being used and with only the transmit-receive controlling circuit 6 being provided therein, the ignition switch 4 may be operated by other operating means.

The communication between the start-up permission ECU 1 and the transmit-receive controlling circuit 6 of the electronic key 3 may be effected in an optical manner.

When the electronic key 3 is inserted in the ignition switch 4, the start-up permission ECU 1 may transmit the random number code to the electronic key 3 so as to determine whether the electronic key is true or false.

In the above-described embodiment, in step S13, it is determined from return code Q whether vehicle code S is blank ($\phi_S$). However, in place of the decision made in step S13, the determination may be made about whether key code K has been registered in the nonvolatile memory of the start-up permission ECU 1 after step S1. Further, in this case, although the determination is made about whether the random number code exists or not in step T6, a determination may be made about whether vehicle code K is stored in the electronic key 3.

Further, in the above-described embodiment, after the registration of key code K in the nonvolatile memory of the start-up permission ECU 1, vehicle code S is registered in the nonvolatile memory of the electronic key 3. However, random number code Rn and random number vehicle code P are transmitted from the start-up permission ECU 1, and the determination is made about whether or not vehicle code S is stored in the electronic key 3. When vehicle code S is not stored and if vehicle code S is decoded, vehicle code S can be previously registered in the electronic key 3. In addition, in this case, so long as random number code Rn is not transmitted from the start-up permission ECU 1 and random number vehicle code P is first transmitted, it is possible to reduce the time for transmission of random number code Rn, and therefore, the time for registration can also be reduced.

INDUSTRIAL AVAILABILITY

As described above, the vehicle start-up permission device and the identification code registering method according to the present invention allow the identification code to be kept secret, and therefore, the present invention is effective in that a vehicle is exclusively possessed by a proper possessor, and the identification code registering method allows the vehicle start-up permission device and a transmitter to be separately managed until both identification codes are registered. Accordingly, in the automobile industry with the division of a manufacturing process being advanced, the present invention is also effective in that the management aspect in production and marketing of vehicles is alleviated.

We claim:

1. An identification code registering method comprising:
   (A) registering a transmitter-receiver code in a transmitter-receiver, the transmitter-receiver code specifying a transmitter-receiver, and a vehicle code in a vehicle start-up permission device, the vehicle code specifying a vehicle;
   (B) transmitting a random number code prepared on the basis of a predetermined procedure in the vehicle start-up permission device to the transmitter-receiver, converting by predetermined encryption processing the transmitter-receiver code to a return code on the basis of the random number code received by the transmitter-receiver,
   transmitting the return code to the vehicle start-up permission device,
   restoring the return code received by the vehicle start-up permission device to the transmitter-receiver code on the basis of the transmitted random number code, and
   registering the transmitter-receiver code in the vehicle start-up permission device; and
   (C) converting by predetermined encryption processing the vehicle code to a random number vehicle code on the basis of the random number code,
   transmitting the random number vehicle code to the transmitter-receiver,
   restoring the random number vehicle code received by the transmitter-receiver to the vehicle code on the basis of the random number code, and
   registering the vehicle code in the transmitter-receiver;
   wherein:
   the transmitter-receiver prepares to a second return code based on a second random number code received by the transmitter-receiver and the transmitter-receiver and vehicle codes registered in the transmitter-receiver;
   the vehicle start-up permission device decodes the second return code to obtain at least the transmitter-receiver code using at least the vehicle code registered in the vehicle start-up permission device; and
   the vehicle start-up permission device permits start-up of an engine only when the transmitter-receiver code subsequently obtained from the transmitter receiver coincides with the transmitter-receiver code stored in the vehicle start-up permission device.

2. An identification code registering method according to claim 1, further comprising, when at least one portion of the transmitter-receiver is determined to be acceptable by the vehicle start-up permission device, executing step (B).

3. An identification code registering method according to claim 2, wherein the transmitter-receiver is a vehicle electronic key, and when the vehicle electronic key is inserted into and turned to a predetermined position of an ignition switch, determining whether the at least one portion of the transmitter-receiver is acceptable by the vehicle start-up permission device.

4. An identification code registering method according to claim 1, wherein step (B) is executed when the transmitter-receiver code of the transmitter-receiver is not registered in the vehicle start-up permission device.

5. An identification code registering method according to claim 1, wherein step (C) is executed when the vehicle code has not yet been registered in the transmitter-receiver.

6. An identification code registering method according to claim 1, wherein the random number code transmitted by the vehicle start-up permission device in step (B) includes information regarding whether the transmitter-receiver code of the transmitter-receiver has been registered in the vehicle start-up permission device.

7. An identification code registering method according to claim 1, wherein the return code transmitted by the transmitter-receiver in step (B) includes at least one of information about that the vehicle code having been registered in the transmitter-receiver and information about that the vehicle code not having been registered.

8. An identification code registering method according to claim 1, wherein the random number code is prepared in an updated state every time.

9. An identification code registering method according to claim 8, wherein the random number code is prepared in a different manner for each of a plurality of vehicle types or for each of a plurality of vehicles.

10. An identification code registering method comprising:
    (A) registering a transmitter-receiver code in a transmitter-receiver, the transmitter-receiver code specifying a transmitter receiver, and a vehicle code in a vehicle start-up permission device;
    (B) converting by predetermined encryption processing the vehicle code to a random number vehicle code on the basis of a random number code prepared by a predetermined procedure in the vehicle start-up permission device,
    transmitting the random number vehicle code to the transmitter-receiver, restoring the random number vehicle code received by the transmitter-receiver to the vehicle code on the basis of the random number vehicle code received by the transmitter-receiver, and registering the vehicle code in the transmitter-receiver; and (C) transmitting the random number code to the transmitter-receiver, converting by predetermined encryption processing the transmitter-receiver code to a return code on the basis of the random number code received by the transmitter-receiver, transmitting the return code to the vehicle start-up permission device, restoring the return code received by the vehicle start-up permission device to the transmitter-receiver code on the basis of the random number code, and registering the transmitter-receiver code in the vehicle start-up permission device;

wherein:

the transmitter-receiver converts the transmitter-receiver code to the return code based on the random number code received by the transmitter-receiver and the vehicle code registered in the transmitter-receiver;

the vehicle start-up permission device decodes the return code to obtain at least the transmitter-receiver code using at least the vehicle code registered in the vehicle start-up permission device; and the vehicle start-up permission device permits start-up of an engine only when the transmitter-receiver code subsequently obtained from the transmitter receiver coincides with the transmitter-receiver code stored in the vehicle start-up permission device.

11. An identification code registering method according to claim 10, further comprising when at least one portion of the transmitter-receiver is determined to be acceptable by the vehicle start-up permission device, executing step (B).

12. An identification code registering method according to claim 11, wherein the transmitter-receiver is a vehicle electronic key, and when the vehicle electronic key is inserted into and turned to a predetermined position of an ignition switch, determining whether the at least one portion of the transmitter-receiver is acceptable by the vehicle start-up permission device.

13. An identification code registering method according to claim 10, wherein step (C) is executed when the vehicle code has not yet been registered in the transmitter-receiver.

14. An identification code registering method according to claim 10, wherein step (C) is executed when the transmitter-receiver code of the transmitter-receiver is not registered in the vehicle start-up permission device.

15. An identification code registering method according to claim 10, wherein the random number code transmitted by the vehicle start-up permission device in step (B) includes information regarding whether the transmitter-receiver code of the transmitter-receiver has been registered in the vehicle start-up permission device.

16. An identification code registering method according to claim 10, wherein the return code transmitted by the transmitter-receiver in step (C) includes information regarding whether the vehicle code has been registered in the transmitter-receiver.

17. An identification code registering method according to claim 10, wherein the random number code is prepared in an updated state every time.

18. An identification code registering method according to claim 17, wherein the random number code is prepared in a different manner for each of a plurality of vehicle types or for each of a plurality of vehicles.

* * * * *